United States Patent [19]

Parry et al.

[11] 3,711,326
[45] Jan. 16, 1973

[54] PROMETHIUM SOURCES
[75] Inventors: Colin Parry; Kenneth J. Round, both of Ottawa, Ontario, Canada
[73] Assignee: Atomic Energy of Canada Limited, Ottawa, Ontario, Canada; a part interest
[22] Filed: June 16, 1969
[21] Appl. No.: 833,797

[30] Foreign Application Priority Data
Aug. 2, 1968 Canada...................................026,548

[52] U.S. Cl. .....................117/217, 117/71, 117/107, 117/220
[51] Int. Cl. ...............................................B44d 1/14
[58] Field of Search.........117/107, 71, 220, 217, 227

[56] References Cited

UNITED STATES PATENTS 3,096,211 7/1963 Davis................................117/107 X
3,489,593 1/1970 Cohen et al. .....................117/107 X Primary Examiner—Alfred L. Leavitt
Assistant Examiner—C. K. Weiffenbach
Attorney—Cushman, Darby & Cushman

[57] ABSTRACT

There is provided an apparatus and a method for the uniform deposition of the $\beta$ emitting nuclide $^{147}$Pm onto precisely defined areas. The technique both produces and deposits the emitting materials simultaneously without the need for separate preparation and purification of the metallic promethium.

12 Claims, No Drawings

PROMETHIUM SOURCES

This invention relates to a method and apparatus for promethium deposition. The invention has particular but not exclusive use in the preparation of promethium beta sources for use in nuclear batteries, thickness gauges, luminous sources, etc., although such sources will find many other applications to those skilled in the art.

It is well known to deposit elements or mixtures of elements by vacuum evaporation and there is abundant literature covering the subject. However, it has not previously been known to produce and simultaneously deposit a thin film of radioactive metal in a single operation. The novel process described herein has certainly never heretofore been applied to the production of promethium sources.

In many applications for beta emitting radio nuclides at least one if not all of the following characteristics must be considered:

a. The beta emitting material must be spread in a very thin uniform layer on the supporting substrate which, in the case of nuclear batteries must be electrically conductive.

b. The radioactive material must be bonded to the substrate, otherwise it may fall off in use, or in the case of nuclear batteries, be attracted to an associated collector electrode.

c. The radioactive material usually needs a thin protective coating to preserve it from mechanical abrasion or damage, and also in the case of reactive elements to prevent tarnishing when exposed to air. This coating must be as thin as possible and is desirably made of low mass number material to minimize beta particle absorption.

The present invention envisages the deposition of the beta emitting nuclide $^{147}$Pm. This material is characterized by a low energy beta emission and its relative cheapness and in view of these it is attractive for use in nuclear batteries. Being a rare earth element, however, it has chemical properties which preclude the usual simple methods of thin film source preparation such as electro-deposition.

It is a feature of one aspect of the invention to provide a method for the simultaneous production and deposition of promethium.

In accordance with the foregoing object the method comprises the steps of (i) preparing a mixture of a compound of a beta emitting nuclide of promethium and a reducing agent, (ii) heating said mixture under vacuum to a temperature sufficient to effect reduction of said compound and evaporation of the promethium; (iii) depositing the promethium vapor on a substrate to form a thin uniform layer of the metal, and (iv) sealing said promethium deposit by the evaporation and deposition of a low mass number metal or other suitable substance before exposure of said promethium to the atmosphere.

The basic aspect of the invention is to evaporate promethium under vacuum, and to deposit the vapor onto a suitable substrate. The freshly deposited promethium is then sealed and protected by a subsequent thin deposit of a vapor of a low mass number metal such as aluminum or titanium before the promethium is exposed to the atmosphere. Alternatively, a thin layer of various compounds such as silica, glass, titanium oxide, alumina, or other ceramic materials may be used for same purpose.

The starting material is normally promethium oxide $Pm_2O_3$ but other forms of promethium, such as promethium fluoride ($PmF_3$) may be used. The oxide is intimately mixed with an excess of a suitable reducing agent, placed in crucible, and heated to a high temperature, in the approximate range (1600° to 2000° C) and enclosed in a chamber under a vacuum. Best results are obtained with vacuums of $10^{-5}$ mm of mercury or better, although the process works with reduced efficiency at $10^{-4}$ mm of mercury. In our process a tantalum crucible was used since tantalum is compatible with rate earth metals at high temperature. Other crucible materials might work and limited success was achieved with molybdenum.

The promethium metal is produced by a reaction, such as

$$Pm_2O_3 + 2M \longrightarrow M_2O_3 + 2Pm\uparrow \qquad (1)$$

The reducing agent M may be any metal for which reaction (1) can proceed. However, it is desirable that the reducing agent and its oxide be less volatile than the promethium at the temperature of reduction, to avoid contamination of the deposited layer. Lanthanum has been found satisfactory as a reducing agent, since lanthanum metal and lanthanum oxide both have low volatilities. Preferential evaporation of promethium will aid in shifting the chemical equilibrium of reaction (1) in the desired direction to the right.

The tantalum crucible may take the form of a hollow metal container with a small hole in the wall thereof. Our crucible had a cylindrical configuration. The crucible may be heated by any convenient means, although we found that the passage of a heavy electric current through the crucible was satisfactory. The temperature must be observed and an optical pyrometer proved satisfactory.

The promethium metal formed in the reduction process evaporates and passes out through the hole in the crucible. A carefully cleaned substrate placed close to the crucible, intercepts the stream of promethium vapor, which forms a uniform film of the desired thinness on the substrate.

The substrate is mounted within the vacuum chamber and is mechanically movable between a first position where the promethium coating is deposited to a second position in which a layer of aluminum, titanium, or other suitable material is subsequently deposited. The aluminum is usually evaporated from an electrically heated tungsten filament, but it can also be evaporated from a suitable refractory crucible. Titanium is usually evaporated from a tungsten filament or from an electron beam heated source. Ceramics may be evaporated from suitable crucibles or deposited by R.F. spluttering. Perforated metal masks may be placed between the evaporation sources and the promethium coated substrate to control the area of deposition, and to ensure that the aluminum or other over-coating overlaps the edges of the promethium. The low mass number materials may also comprise beryllium, nickel, chromium, glass, silicon oxide, silicon nitride, aluminum oxide or titanium oxide.

Our invention has several advantages which include:

a. Elimination of the need to separately prepare and purify metallic promethium, which is a difficult operation in view of the chemistry of the element and its rarity.

b. The process gives a very thin and uniform layer of promethium on the substrate. The promethium metal film also appears to form a tenacious bond to metal substrates.

c. The over-coating gives good protection from atmospheric attack and mechanical abrasion during battery assembly, but is so thin and of such material that that beta particle emission is only slightly attenuated.

d. The process may be used to deposit promethium on precisely defined areas of almost any substrate material which will withstand the radiant heating of the evaporation sources.

e. With the apparatus we have developed, substrates may be coated on both surfaces. It is also possible to coat many sources in a single operation, the present apparatus, for example, can handle 24 substrate specimens at a time. Large scale productions process should be relatively simple.

While the invention has been described with application to the nuclide $^{147}$Pm, the process is applicable to other rare earth elements whose chemistry is similar to promethium. The process should work well for any reasonably volatile metallic element which can be reduced in situ.

Other variations and applications falling within the terms of the appended claims will occur to those skilled in the art.

We claim:

1. A method of preparing a radioactive metal comprising promethium beta sources and simultaneously depositing a relatively thin, uniform film thereof on a support-substrate in a single operation comprising the successive steps of:
   a. mixing a source of beta emitting nuclide of promethium with a reducing agent therefore;
   b. heating said mixture at a temperature of about 1,600° to about 2,000° C. under a reduced pressure of at least $10^{-4}$ mm of mercury, said temperature sufficient to effect:
      1. reduction of said promethium source, and
      2. evaporation of said promethium;
   c. depositing the promethium vapor formed in step (b) on a substrate thereby forming a thin uniform layer of promethium metal thereon; and
   d. sealing said promethium deposited in step (c) before exposure of said promethium layer to the atmosphere.

2. Method according to claim 1 wherein said reduced pressure is from about $10^{-5}$ to $10^{-4}$ mm of mercury.

3. A method of preparing thin promethium beta sources comprising the steps of:
   i. preparing a mixture of a reducing agent and a compound of a beta emitting nuclide of promethium selected from the group consisting of promethium oxide and promethium fluoride,
   ii. heating said mixture in a vacuum to a temperature sufficient to effect reduction of said compound and to effect the formation of promethium vapor,
   iii. depositing said promethium vapor on a substrate to form a thin uniform layer of promethium metal thereon, and
   iv. sealing the promethium layer by the evaporation and deposition of a layer of sealing material to protect said promethium layer from atmospheric attack and mechanical abrasion.

4. The method defined in claim 3 wherein the heating of step (ii) is effected by the passage of an electric current.

5. The method defined in claim 3 wherein said sealing material in step (iv) is selected from the group consisting of aluminum, titanium, beryllium, nickel, chromium, glass, silicon nitride, aluminum oxide or titanium oxide.

6. The method defined in claim 3 wherein step (iv) is effected by the electrical heating and vaporization of aluminum.

7. The method defined in claim 3 wherein said sealing material is titanium and wherein the titanium is evaporated from a heated filament or from an electron beam heated source.

8. The method of claim 3 wherein said reducing agent and its oxide is less volatile than the said promethium at the temperature of reduction.

9. The method of claim 3 wherein said reducing agent is lanthanum metal.

10. The method defined in claim 3 wherein said nuclide of promethium is Pm$^{147}$.

11. The method of claim 3 wherein the promethium vapor produced in step (ii) is in the form of a stream.

12. The method defined in claim 11 wherein said stream is directed towards said substrate when said substrate is in a first position and the deposition of said sealing material is effected when said substrate is subsequently moved to a second position.

* * * * *